United States Patent [19]

Möltgen et al.

[11] Patent Number: 5,525,135

[45] Date of Patent: Jun. 11, 1996

[54] ABRASIVE MATERIAL BASED ON ZIRCONIUM CORUNDUM A PROCESS FOR ITS PRODUCTION AND ITS USE

[75] Inventors: Paul Möltgen, Laufenburg; Wolfgang Gallmann, Murg, both of Germany

[73] Assignee: H. C. Starck GmbH & Co. KG, Goslar, Germany

[21] Appl. No.: 442,632

[22] Filed: May 17, 1995

Related U.S. Application Data

[63] Continuation of Ser. No. 138,401, Oct. 18, 1993, abandoned.

[30] Foreign Application Priority Data

Oct. 19, 1992 [DE] Germany .......................... 42 35 134.0
Mar. 5, 1993 [DE] Germany .......................... 43 06 966.5

[51] Int. Cl.$^6$ .................................................. C04B 35/48
[52] U.S. Cl. .................. 51/309; 51/295; 501/87; 501/105; 451/28
[58] Field of Search ...................... 501/87, 105; 51/309, 51/295; 451/28

[56] References Cited

U.S. PATENT DOCUMENTS

| | | |
|---|---|---|
| 3,891,408 | 6/1975 | Rowse et al. . |
| 4,059,417 | 11/1977 | Ilmaier et al. . |
| 4,070,796 | 1/1978 | Scott . |
| 4,111,668 | 9/1978 | Walker et al. .............................. 51/309 |
| 4,543,343 | 9/1985 | Iyori et al. .................................. 501/87 |
| 4,748,138 | 5/1988 | Watanabe et al. .......................... 501/87 |
| 5,061,665 | 10/1991 | Seki et al. ................................. 501/105 |
| 5,143,522 | 9/1992 | Gibson et al. ......................... 51/309 X |
| 5,147,833 | 9/1992 | Manning et al. ........................ 501/105 |
| 5,188,908 | 2/1993 | Nishiyama et al. ................. 501/105 X |
| 5,275,981 | 1/1994 | Nishiyama et al. ....................... 501/87 |

FOREIGN PATENT DOCUMENTS

| | | |
|---|---|---|
| 0480678 | 4/1992 | European Pat. Off. . |
| 0140370 | 8/1982 | Japan ........................................ 501/87 |
| 0160959 | 10/1982 | Japan ........................................ 501/87 |
| 0185477 | 10/1983 | Japan ...................................... 501/105 |
| 59-227726 | 12/1984 | Japan . |
| 2-36152 | 8/1990 | Japan . |
| 2062666 | 11/1979 | United Kingdom . |
| 85034234 | 12/1984 | WIPO . |

*Primary Examiner*—Mark L. Bell
*Assistant Examiner*—David Sample
*Attorney, Agent, or Firm*—Jerry Cohen

[57] ABSTRACT

The invention relates to an abrasive material based on α-$Al_2O_3$ and $ZrO_2$ with a content of titanium compounds in the form of suboxides, carbides and/or oxycarbides, to a process for its production and to its use.

7 Claims, No Drawings

1

ABRASIVE MATERIAL BASED ON ZIRCONIUM CORUNDUM A PROCESS FOR ITS PRODUCTION AND ITS USE

This is a continuation of application Ser. No. 08/138,401, filed Oct. 18, 1993 now abandoned.

This invention relates to an abrasive material based on α-$Al_2O_3$ and $ZrO_2$ with a content of titanium compounds in the form of suboxides, carbides and/or oxycarbides, to a process for its production and to its use.

BACKGROUND OF THE INVENTION

Zirconium corundums, which are produced by extremely rapid cooling of a melt, are distinguished by particularly advantageous abrasive properties.

Thus, German Patent Application DE-A 2 519 569 describes an abrasive material based on $Al_2O_3$ and $ZrO_2$, optionally with accompanying substances or additions consisting of chromium, iron, titanium, vanadium, magnesium and/or rare earths in the form of oxides, carbides, carbonitrides and nitrides for use in precision grinding or semi-precision grinding. The additions are not used to increase grinding performance, but are supposed to be kept as small as possible to avoid reductions in quality.

German Patent Application DE-A 2 160 705 describes an abrasive material produced by melting a mixture of $Al_2O_3$ with an addition of 5 to 45% by weight $ZrO_2$, preferably 25% by weight $ZrO_2$ and 0 to 4% by weight $TiO_2$.

German Patent Application DE-A 2 227 462 describes a zirconium corundum which is cooled extremely rapidly by pouring a melt of $Al_2O_3$ and $ZrO_2$ prepared under reducing conditions between metal plates and which is eminently suitable for use in abrasives by virtue of the crystallite structure thus stabilized and the content of tetragonal high-temperature modification of $ZrO_2$.

The phase transition of the $ZrO_2$ during the grinding process from the tetragonal high-temperature modification into the monoclinic form stable at room temperature causes the appearance of transition-induced microcracks through the resulting increase in volume so that the material has to be strengthened by energy dissipation.

German Patent Application DE-A 3 040 992 describes a zirconium corundum containing 27 to 35% by weight $ZrO_2$ and—expressed as $TiO_2$—1 to 10% by weight oxycarbides, carbides or suboxides of titanium obtained by reduction of $TiO_2$. The performance of this abrasive material is characterized as equal to or better than that of the material described in DE-A 2 227 642. However, the advantage of this abrasive material is seen above all in the reduction in manufacturing costs for the same abrasive performance which is achieved by reduction of the $ZrO_2$ content.

The mechanism on which this improvement in the properties of the abrasive material by the titanium compounds is based remains largely unresolved. It is assumed in DE-A 3 040 992 that the grinding process is directly influenced by the titanium compounds which are said to participate actively in the grinding process.

Both DE-A 3 040 992 and DE-A 2 227 642 disclose abrasive materials which contain at least 25% by weight, based on the $ZrO_2$ content, of tetragonal $ZrO_2$ modification.

U.S. Pat. No. 5,143,522 describes an abrasive grain with a content of 20–50% by weight of $ZrO_2$, more than 25% of which is in the tetragonal form, 1–10% by weight of reduced titanium oxide in the form of suboxides, carbides or oxycarbides, 0.03–0.5% by weight of carbon, less than 3% by weight of impurities and $Al_2O_3$ as the main constituent. The structure of the grain is described as consisting of primary $Al_2O_3$ crystals embedded in a eutectic alumina-zirconia matrix. The size of the primary crystals is between 5 and 50 microns.

Japanese patent 1 614 974 (Appl. No. Sho 58-102289) describes zirconium corundums containing titanium dioxide in which up to 100% of the $ZrO_2$ is present in the tetragonal modification. It is apparent from this document that the $Y_2O_3$ also added is solely responsible for the stabilization and enrichment of the tetragonal phase. Thus, the Examples in the specification only show an increase over the undoped standard in the case of the samples doped with $Y_2O_3$.

The addition of $Y_2O_3$ adds to the production costs of the abrasive material. The abrasive performance improved by the high percentage contents of tetragonal $ZrO_2$ modification is also limited by the fact that $Y_2O_3$ or $Y_2O_3$-containing compounds do not themselves have any properties beneficial to the grinding process.

The object of the present invention is to provide a zirconium corundum abrasive material which would show improved performance compared with hitherto known zirconium corundums without any increase in production costs by comparison with conventional zirconium corundums so that, where the abrasive material according to the invention is used, an even more favorable price-to-performance ratio could be achieved for a number of grinding operations than was possible in the prior art.

SUMMARY OF THE INVENTION

It has now surprisingly been found that the percentage contents of the tetragonal $ZrO_2$ modification can be drastically increased by addition of small quantities of $TiO_2$ to an $Al_2O_3/ZrO_2$ mixture, melting of the mixture in the presence of reducing agents and sudden quenching of the melt. It has been found that there is linear dependence between the quantity of $TiO_2$ and the proportion of the tetragonal phase.

It is possible in this way to obtain an abrasive material based on α-$Al_2O_3$ and $ZrO_2$ with a content of titanium compounds in the form of suboxides, carbides and/or oxycarbides, in which more than 80% by weight of the $ZrO_2$ is present in the tetragonal crystal form. The abrasive material according to the invention is distinguished by extremely high abrasive performance levels.

In one particularly preferred embodiment of the abrasive material according to the invention, more than 90% by weight of the $ZrO_2$ is present in the tetragonal crystal form. Particularly high abrasive performance levels are achieved when the $ZrO_2$ content is between 35 and 50% by weight.

A particularly preferred mixing range of the $Al_2O_3$ melt is in the vicinity of the eutectic (between 37 and 45% by weight $ZrO_2$, based on the sum of $ZrO_2$ and $Al_2O_3$). It is possible in this range to stabilize particularly high percentage contents of tetragonal $ZrO_2$ modification.

$TiO_2$ or other Ti compounds are not described in the literature as stabilizers for the high-temperature modification of $ZrO_2$. CaO, MgO, $Y_2O_3$ or other oxides of the rare earths are normally used for the purpose.

Comparative tests with these stabilizers have surprisingly shown that, in the $Al_2O_3/ZrO_2$ system, the stabilizing effect of titanium compounds in the form of suboxides, carbides and/or oxycarbides is more effective than that of the known stabilizers MgO and CaO. Only $Y_2O_3$ surpasses the reduced form of $TiO_2$ in its stabilizing effect on $ZrO_2$.

Particularly good properties are obtained when the quantity of titanium compounds is between 0.5 and 10% by weight, preferably between 1 and 5% by weight, expressed as $TiO_2$.

It has surprisingly been found that the most successful grinding results are obtained with a grain which has a highest possible content of tetragonal $ZrO_2$ phase but not too high a content of Ti compounds.

A high content of Ti compounds apparently changes the viscosity of the melt and makes it difficult to quench the melt uniformly and quickly, so that ideally completely homogeneous eutectic structures of $ZrO_2$ and $Al_2O_3$ crystals with a crystallite size in the submicron range are increasingly impaired by segregation effects due to the unsatisfactory quenching process.

Such segregation effects change the properties of the grain and reduce the grinding performance of the abrasive materials produced therefrom.

An optimum structure is one which is present in a completely eutectic form. Experience has however shown that a small degree of segregation cannot be avoided even under optimum quenching conditions, since zirconium corundum, which is an excellent insulating material, does not allow completely simultaneous solidification of the entire melt.

The content of impurities, expressed as oxides, should advantageously be at most 3% by weight. The content of rare earths, expressed as oxides, is preferably at most 0.1% by weight.

The surprisingly good grinding results which can be obtained with the abrasive materials according to the invention are far superior to those of known zirconium corundums with comparable percentage contents of tetragonal $ZrO_2$ phase. This suggests that the titanium compounds in the form of carbides, suboxides and/or oxycarbides actively participate in the grinding process.

The present invention also relates to a process for the production of the abrasive material according to the invention, characterized in that a mixture of $Al_2O_3$, $ZrO_2$ and $TiO_2$ and/or raw materials containing these substances are melted in the presence of reducing agents and quenched. Quenching should preferably be carried out in such a manner that the melt solidifies completely in no more than 10 seconds. Thereafter the material should not be exposed to temperatures above about 700° C. to prevent phase transition of the $ZrO_2$ present in the tetragonal phase into the monoclinic modification.

The process can be carried out particularly economically by using natural raw materials to form the melt, including in particular alumina, bauxite, baddeleyite, zirconium sand, rutile and ilmenite.

Carbon in the form of graphite or coke is preferably used as reducing agent in the process according to the invention.

The present invention also relates to the use of the abrasive material according to the invention in bonded abrasives and abrasives on substrates.

DETAILED DESCRIPTION OF PREFERRED EMBODIMENTS

The following examples are intended to illustrate the invention without limiting it in way.

EXAMPLE 1

Quantities of 0, 0.5, 1, 2.5, 5 and 10% by weight $TiO_2$ (rutile), based on the sum of the individual components, were added to a mixture of 240 kg alumina, 170 kg baddeleyite and 12 kg petroleum coke which was then melted in an electric arc furnace. The furnace chamber had a diameter of 2 m, the voltage was 110 V and the selected load 1100 kWh. The liquid melt was quenched to temperatures below 600° C. by pouring into an approx. 5 mm wide gap between metal plates with full solidification achieved in less than 20 seconds oxygen was substantially excluded during quenching.

The products thus obtained are characterized in Table 1:

TABLE 1

| Test No. | $TiO_2$ (%) as rutile | Analytical data (%) | | T (%) = percentage contents of tetragonal phase based on |
|---|---|---|---|---|
| | | $TiO_2$ | $ZrO_2$ | total $ZrO_2$ |
| 1 (Comparison) | — | 0.15 | 41.6 | 46 |
| 2 | 0.5 | 0.63 | 42.4 | 55 |
| 3 | 1.0 | 1.08 | 43.1 | 78 |
| 4 | 2.5 | 2.72 | 41.2 | 97 |
| 5 | 5.0 | 4.98 | 40.8 | 100 |
| 6 | 10.0 | 9.82 | 39.5 | 100 |

The percentage contents of tetragonal phase were calculated in accordance with the following equation:

$$T\,(\%\text{ by weight}) = \frac{2t \times 100}{2t + m1 + m2}$$

where
t=intensity of the tetragonal peak at theta=30.3
m1=intensity of the monoclinic peak at theta=28.3
m2=intensity of the monoglinic peak at theta=31.5

The equation is based on the X-ray diffraction analysis of zirconium corundum powders (X-ray diffractograms).

The various materials were tested in P 36 grit in abrasive belts against 42CrMo4 under a contact pressure of 70N. The grinding time was 12 minutes.

TABLE 2

| Test No. | Abrasion | Grinding performance (%) compared with the prior art (test No. 1) |
|---|---|---|
| 1 | 937.6 | 100 |
| 2 | 965.1 | 103 |
| 3 | 1105.6 | 118 |
| 4 | 1386.7 | 148 |
| 5 | 1236.8 | 132 |
| 6 | 1189.9 | 127 |

EXAMPLE 2

Quantities of 1% $TiO_2$, $Y_2O_3$, CaO or MgO were added to a mixture of 240 kg alumina, 170 kg baddeleyite and 12 kg petroleum coke. The melting and cooling conditions were as in Example 1.

The products thus obtained are characterized in Table 3:

TABLE 3

| Test No. | Stabilizers used in %, based on the sum of the individual components | | | | T (%) |
|---|---|---|---|---|---|
| | TiO$_2$ | Y$_2$O$_3$ | CaO | MgO | |
| 7 | 1 | — | — | — | 76 |
| 8 (Comparison) | — | 1 | — | — | 96 |
| 9 (Comparison) | — | — | 1 | — | 56 |
| 10 (Comparison) | — | — | — | 1 | 42 |

The grinding tests were carried out under the same conditions as in Example 1. To allow direct comparison, a sample according to test No. 1 (undoped) was also ground as standard.

TABLE 4

| Test No. | Grinding test | |
|---|---|---|
| | Abrasion (%) | Grinding performance (%) |
| 1 (Comparison) | 953.7 | 100 |
| 7 | 1200.8 | 126 |
| 8 | 1115.8 | 117 |
| 9 | 638.5 | 67 |
| 10 | 933.9 | 98 |

EXAMPLE 3

A mixture of 240 kg alumina, 170 kg baddeleyite and 11 kg rutile was melted and quenched under the conditions of Examples 1 and 2 without the addition of carbon as reducing agent (test 11).

In test 12, 12 kg petroleum coke were added as usual; the melting conditions were as in the other Examples except that the melt was not quenched, but instead was poured into an open crucible.

For direct comparison, test 4 of Example 1 is included in Table 5.

TABLE 5

| Test No. | Additions used | | Cooling conditions | T (%) |
|---|---|---|---|---|
| | TiO$_2$ | C | | |
| 4 | 2.5% | 2.8% | Quenching | 96 |
| 11 (Comparison) | 2.5% | — | Quenching | 36 |
| 12 (Comparison) | 2.5% | 2.8% | Slow cooling | 42 |

No grinding tests were carried out with the test materials of Example 3.

We claim:

1. An abrasive material comprising $\alpha$-Al$_2$O$_3$ and ZrO$_2$, the ZrO$_2$ present as 35–50 weight percent of combined $\alpha$-Al$_2$O$_3$ and ZrO$_2$, and a content of titanium compounds selected from the group consisting of titanium suboxides, titanium carbides, titanium oxycarbides and mixtures thereof, as made by melting said components together in the presence of reducing agent and quenching to solidify completely in under ten seconds, whereby the resultant abrasive material has a eutectic matrix with alumina and zirconia sub-micron crystals, at least 90 weight percent of the zirconia is present in the tetragonal crystal form and the quantity of titanium compounds is from 1 up to 5 weight percent of the material, but sufficient to accommodate 90 weight percent or higher of tetragonal crystal formation in the ZrO$_2$.

2. An abrasive material as claimed in claim 1 wherein the abrasive material contains at most 3% by weight impurities expressed as oxides.

3. An abrasive material as claimed in claim 2 wherein the abrasive material contains at most 0.1% by weight rare earths expressed as oxides.

4. A process of grinding comprising use of the product of any one of claims 1, 2 or 3 as a grinding medium.

5. A coated abrasive comprising an abrasive material therein as set forth in claim 1.

6. An abrasive material comprising $\alpha$-Al$_2$O$_3$ and ZrO$_2$ the ZrO$_2$ present as 35–50 weight percent of combined $\alpha$-Al$_2$O$_3$ and ZrO$_2$, and a content of titanium compounds selected from the group consisting of titanium suboxides, titanium carbides, titanium oxycarbides and mixtures thereof, and having an eutectic matrix with alumina and zirconia sub-micron crystals, at least 90 weight percent of the zirconia being present in the tetragonal crystal form and the quantity of titanium compounds being from 1 up to 5 weight percent of the material, but sufficient to accommodate 90 weight percent or higher of tetragonal crystal formation in the ZrO$_2$.

7. An abrasive material as claimed in either of claims 1 or 6 wherein:

(a) the content of impurities therein, expressed as oxides, is at most 3% by weight of the material, (b) the ZrO$_2$ content is 37 to 45% by weight of the material, (c) the content of rare earths, expressed as oxides, is at most 0.1% by weight of the material.

* * * * *